US005436747A

United States Patent [19]

Suzuki

[11] Patent Number: 5,436,747

[45] Date of Patent: Jul. 25, 1995

[54] REDUCED FLICKER LIQUID CRYSTAL DISPLAY

[75] Inventor: Hiroshi Suzuki, Fujisawa, Japan

[73] Assignee: International Business Machines Corporation, Armonk, N.Y.

[21] Appl. No.: 290,630

[22] Filed: Aug. 15, 1994

Related U.S. Application Data

[63] Continuation of Ser. No. 148,018, Nov. 4, 1993, abandoned, which is a continuation of Ser. No. 727,201, Jul. 9, 1991, abandoned.

[30] Foreign Application Priority Data

Aug. 16, 1990 [JP] Japan .................................. 2-215139

[51] Int. Cl.[6] ......................... G02F 1/133; G09G 3/36

[52] U.S. Cl. ......................................... 359/55; 359/57; 359/87; 345/96; 345/149

[58] Field of Search ........................ 359/54, 55, 57, 66, 359/84, 85, 86; 340/702, 703, 765, 784, 793; 358/236; 345/87, 92, 209, 96, 94, 103, 149; 348/761, 766, 791, 793

[56] References Cited

U.S. PATENT DOCUMENTS

| | | | |
|---|---|---|---|
| 4,822,142 | 4/1989 | Yasui | 359/68 |
| 4,842,371 | 6/1989 | Yasuda et al. | 359/57 |
| 4,850,677 | 7/1989 | Okumura | 359/55 |
| 4,995,703 | 2/1991 | Noguchi | 359/87 |
| 5,041,823 | 8/1991 | Johnson et al. | 345/94 |
| 5,093,655 | 3/1992 | Tanioka et al. | 345/96 |
| 5,107,353 | 4/1992 | Okumura | 359/55 |
| 5,365,284 | 11/1994 | Matsumoto et al. | 348/793 |

FOREIGN PATENT DOCUMENTS

| | | | |
|---|---|---|---|
| 0151615 | 8/1985 | Japan | 359/57 |
| 0071932 | 4/1987 | Japan | 359/57 |
| 0242920 | 10/1987 | Japan | 359/55 |
| 0244018 | 10/1987 | Japan | 359/54 |
| 0074036 | 4/1988 | Japan | 359/57 |
| 0351253 | 1/1990 | Japan | 340/784 |

OTHER PUBLICATIONS

"New Driving Method for Liquid Crystal Display" IBM Technical Disclosure Bulletin–Vol. 30–No. 12–May 1988–pp. 7–8.

*Primary Examiner*—Anita Pellman Gross
*Assistant Examiner*—Tai V. Duong
*Attorney, Agent, or Firm*—David Aker

[57] ABSTRACT

A liquid crystal display including row conductors and column conductors divided into odd conductor groups and even conductor groups. Each of the groups includes two or more adjacent conductors. A plurality of adjacent subpixels in a row direction and in a column direction form a single pixel. The adjacent subpixels in the single pixel are divided into a first subpixel group including adjacent subpixels arranged in the column direction and a second subpixel group including adjacent subpixels arranged in the column direction. The first subpixel group is connected to a first conductor of an odd conductor group and the second subpixel group is connected to a second conductor of the odd conductor group. An adjacent pixel in the row direction has a first subpixel group connected to one conductor of an even conductor group and a second subpixel group connected to a second conductor of the even conductor group. A row driver sequentially supplies row signals to the row conductor and column drivers connected to the column conductors supply data signals of one polarity to the odd conductor groups and data signals of an opposite polarity to the even conductor groups, and alternately change the polarity of data signals applied to the odd conductor groups and the even conductor groups every two or more rows in the column direction between one polarity and the opposite polarity.

16 Claims, 3 Drawing Sheets

REDUCED FLICKER LIQUID CRYSTAL DISPLAY

This application is a continuation of application Ser. No. 08/148,018 filed on Nov. 4, 1993, now abandoned, which is a continuation of Ser. No. 07/727,201 filed Jul. 9, 1991, now abandoned.

FIELD OF THE INVENTION

This invention relates to active matrix type liquid crystal displays using thin film transistors (TFT) as switching elements. More particularly, it is related to reducing flicker in such liquid crystal displays.

BACKGROUND ART

In a conventional liquid crystal display using an active matrix type liquid crystal panel, alternating current drive is applied to liquid crystal elements by inverting the polarity of the data signals to prevent the liquid crystal elements from being degraded.

FIG. 1 is a schematic diagram of a conventional, liquid crystal display as described above. In the figure, a gate driver 1 is connected to n row conductors G1 to Gn to which scanning signals are sequentially applied. A first data driver 2 is connected to odd column conductors D1 to Dm−1 to which first data signals are applied. A second data driver 3 is connected to even column conductors D2 to Dm to which second data signals are applied. TFT's 4*a*, 4 *b*, 4*c*, and 4*d* are provided at the respective intersections of the row conductors and the column conductors, with each one of their gate electrodes being connected to a corresponding one of the row conductors, each one of their drain electrodes being connected to a corresponding one of the data signal lines, and their respective source electrodes being connected to subpixels 5*a*, 5*b*, 5*c*, and 5*d* as described below. Subpixels 5*a*, 5*b*, 5*c*, and 5*d*, each of which is a liquid crystal cell, are driven by the TFT's 4*a*, 4*b*, 4*c*, and 4*d*, respectively.

For area gradation of these subpixels (i.e. to display grey scale) a single pixel is comprised of the four adjacent subpixels 5*a*, 5*b*, 5*c*, and 5*d* which may also be vertically or horizontally arranged. In this case, predetermined levels of gradation over a range of grey scale can be displayed by selecting properly the ratio of the sizes or areas of the subpixels 5*a*, 5*b*, 5*c*, and 5*d*.

The conventional method for driving the subpixels of FIG. 1 is as follows. First, gate signals are sequentially applied to the gate electrodes of the TFT's 4*a*, 4*b* and 4*c*, 4*d* (connected to their respective row conductors), by the gate driver 1 in response to control signals from a controller (not shown). TFT's 4*a*, 4*b* and 4*c*, 4*d* are sequentially turned on. A first data signal and a second data signal are applied to each column conductor simultaneously with these gate signals, from the first data driver 2 and the second data driver 3. The first and the second data signals may have the same polarity or opposite polarity and, are inverted every frame.

When the first and the second data signals are signals of the same polarity, the polarity of signal applied to all subpixels on the entire display screen is simultaneously inverted every frame.

However, when the first and the second data signals are signals of opposite polarity, subpixels on the entire display screen are inverted and driven by signals of opposite polarity in the row direction.

In the conventional liquid crystal display as described above, data signals having the same phase are inverted every frame and are applied to each odd data signal line and each even data signal line respectively. Noticeable flicker is present because the entire display screen is driven by alternating current which is inverted in polarity every frame.

It will be appreciated that when data signals having opposite phase, which are inverted every frame, are applied to each odd data signal line and each even data signal line, respectively, noticeable flicker on the screen is present to almost the same degree as in the case where data signals with the same phase are applied, as described above. This is because the entire display screen is driven by alternating current which is changed in polarity every sub pixel in the row direction.

SUMMARY OF THE INVENTION

It is an object of the invention to provide a liquid crystal display on which 16 levels of gray scale can be displayed without noticeable flicker It is another object of the invention to provide a liquid crystal display having reduced flicker and low power consumption.

In accordance with the invention, a liquid crystal display comprises a plurality of row conductors, a plurality of column conductors, a plurality of subpixels arranged in a matrix, and means for alternately applying first and second data signals to said column conductors every two column conductors; said subpixels in the same row being connected to the same row conductor, one column of adjacent subpixels of each pixel in the column direction being alternately connected, every two row conductors, to a conductor to which said first data signal is supplied and to a conductor to which said second data signal is supplied, the other column of adjacent subpixels of said each pixel in the column direction being alternately connected, every two column conductors, to said conductor to which said first data signal is supplied and to said conductor to which said second data signal is supplied.

A liquid crystal display in accordance with the invention may also comprise a plurality of row conductors, a plurality of column conductors, a plurality of subpixels arranged in a matrix, and means for applying alternately first and second data signals to said column conductors every two column conductors, said subpixels in the same row being connected to the same row conductor, the polarity of said first and said second data signals being alternately inverted every two row conductors.

According to the invention, a first data signal of one polarity and a second data signal of the opposite polarity are applied and tile polarity of the first and second data signals is inverted at a repetition interval which is substantially the same as a frame interval.

DETAILED DESCRIPTION OF THE PREFERRED EMBODIMENT

Figure 2:
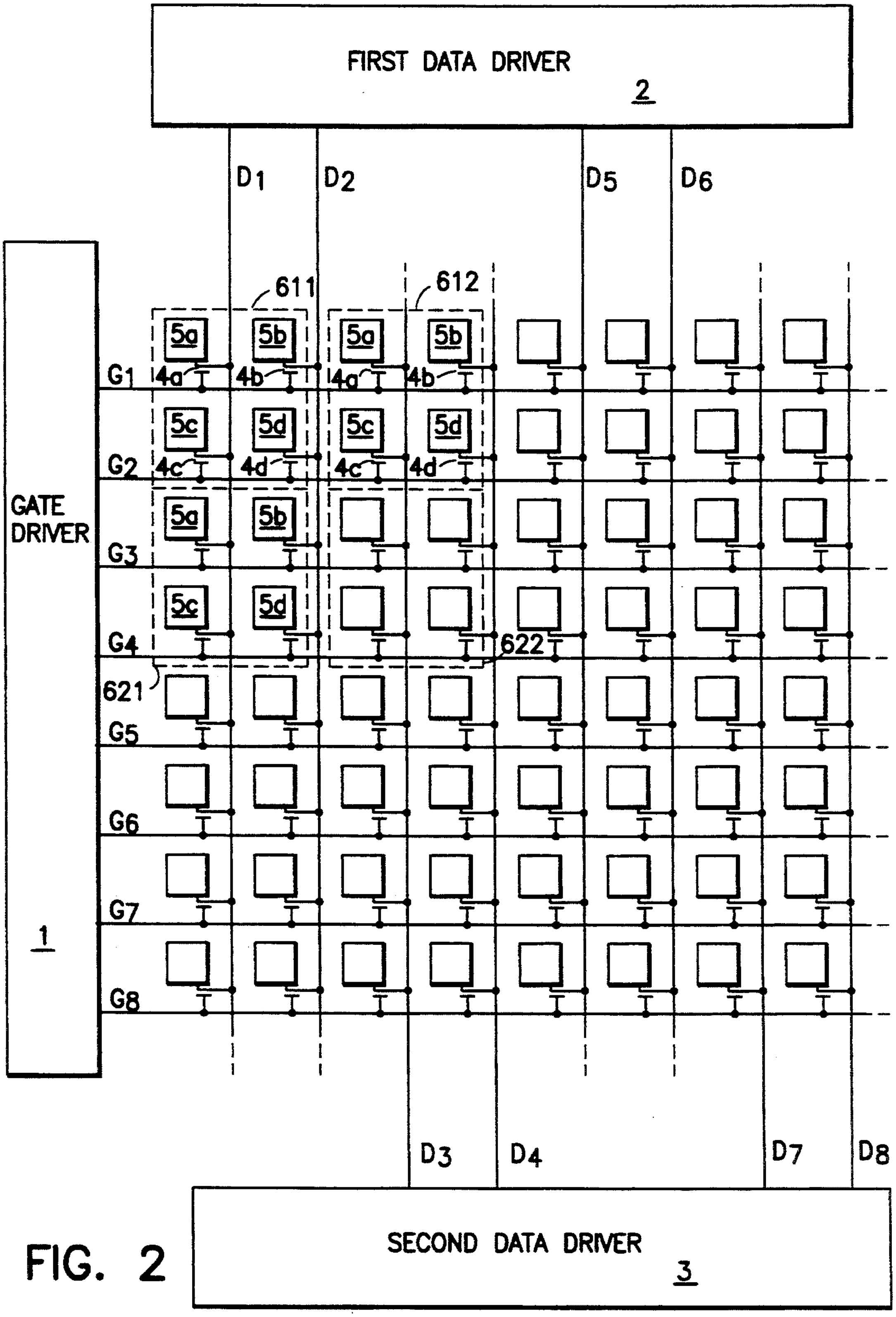
FIG. 2 is a schematic diagram of a liquid crystal panel in accordance with a first embodiment of the invention.

FIG. 2 schematically illustrates a first embodiment of an 8×8 matrix type liquid crystal panel of a liquid crystal display according to the invention. In the figure, a gate driver 1 is connected to row conductors G1 to G8 and sequentially outputs scanning signals to the row conductors G1 to G8. Column conductors D1 to D8 are alternately connected to a first data driver 2 and a second data driver 3. The first data driver 2 and the second data driver 3 output a first data signal of one polarity and a second data signal of the opposite polarity, respectively. The gate electrodes of TFT's 4a and 4b and TFT's 4c and 4d (and those having corresponding positions in other pixels) are connected to row conductors G1, G3, G5, and G7 and G2, G4, G6, and G8, respectively. The respective source electrodes of the TFT's 4a, 4b, 4c, and 4d are connected to subpixels 5a, 5b, 5c, and 5d, respectively. The drain electrodes of TFT's 4a, 4b, 4c, and 4d are alternately connected to the first group of the column conductors D1 and D2, and D5 and D6 which are connected to the first data driver 2. The second group of the column conductors D3 and DS, and D7 and D8 are connected to the second data driver 3. Each of pixels 611, 612 . . . 621, 622 . . . is comprised of four adjacent subpixels 5a, 5b, 5c, and 5d. In the figure, the subpixels 5a, 5b, 5c, and 5d are illustrated, for convenience, with their areas being equal. However, if 16 levels of grey scale are to be displayed by area gradation of one pixel based on various combinations of the ON/OFF state of the subpixels 5a, 5b, 5c, and 5d and the pixels having different area ratios, the subpixels 5a, 5b, 5c, and 5d may have area ratios of their respective areas A, B, C, and D equal to 8:2:4:1.

In practice, control signals are provided to the gate driver 1, the first data driver 2, and the second data driver 3 by a control unit (not shown) to cause these blocks to operate. The gate driver 1 sequentially applies scanning or gate signals to the row conductors G1 to G8. When the scanning signals are applied, the TFT's 4a, 4b and 4c, 4d of respective pixels are sequentially turned on. A first data signal of one polarity from the first data driver 2 and a second data signal of opposite polarity to that of the first data signal, from the second data driver 3 are applied, simultaneously with the scanning signals, to the first group of the column conductors D1 and D2, and D5 and D6 and to the second group of the column conductors D3 and D4, and D7 and D8, respectively.

In this case, the scanning signals from the gate driver 1 cause the switches (not shown) of the first data driver 2 and the second data driver 3 to switch, every two row conductors; that is, each of G1 to G2, G3 to G4, and G5 to G6, G7 to G8, and first data signals and second data signals applied to the column conductors D1 to D8 to be inverted. Thus, adjacent pixels in the row direction (pixels 611 and 612, pixels 621 and 622) and adjacent pixels in the column direction (pixels 611 and 621, and pixels 612 and 622) are driven by data signals of opposite polarity. The other adjacent pixels of the display are driven in a similar manner, thus eliminating flicker of the display screen. Since the liquid crystal panel is driven by alternating current, the polarity of the first data signal and that of the second data signal are inverted every frame. Since adjacent pixels in the row direction and in the column direction are driven by signals of opposite polarity, flicker is removed.

Figure 1:
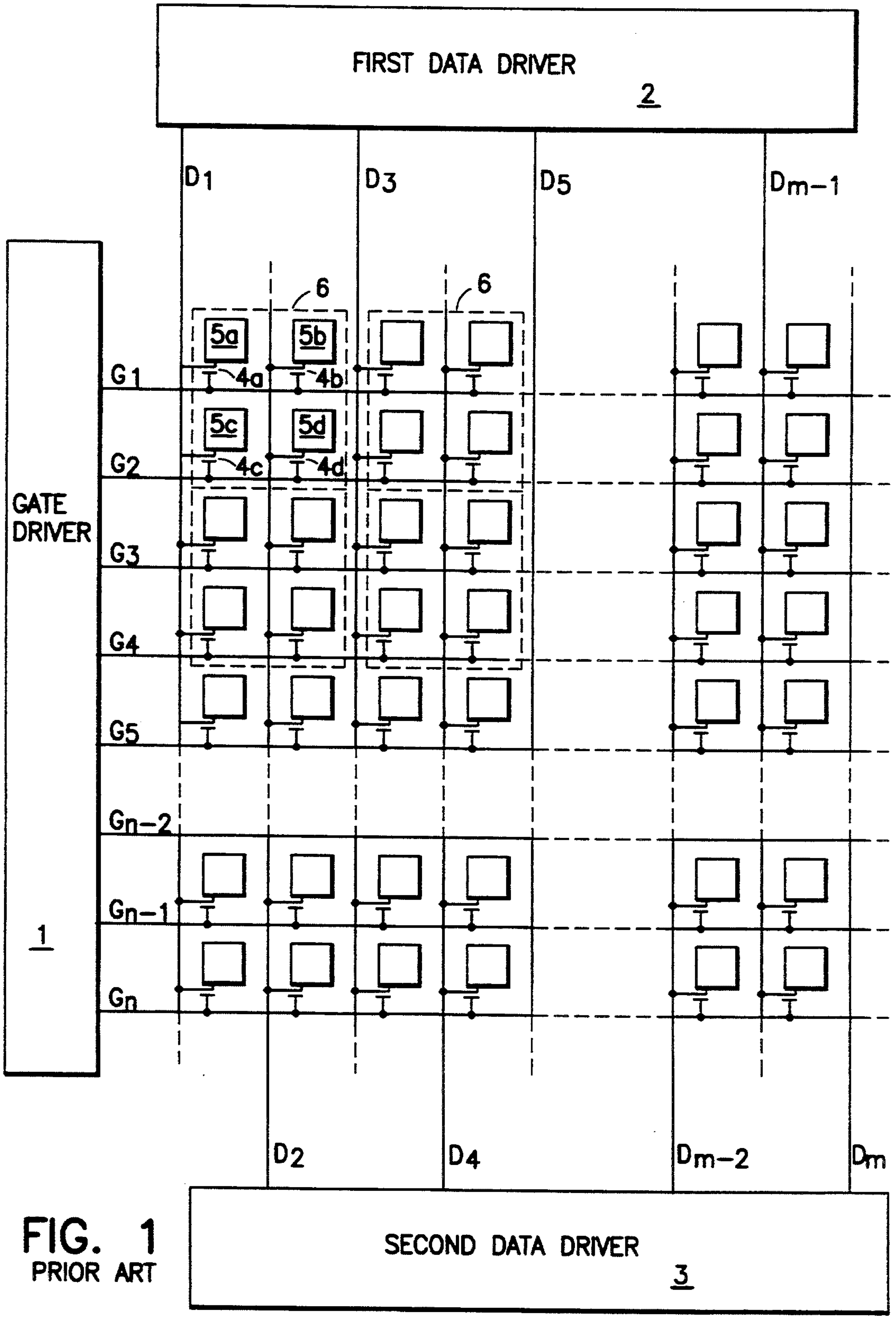
FIG. 1 PRIOR ART
FIG. 1 is a schematic diagram of a conventional liquid crystal panel.
Figure 3:
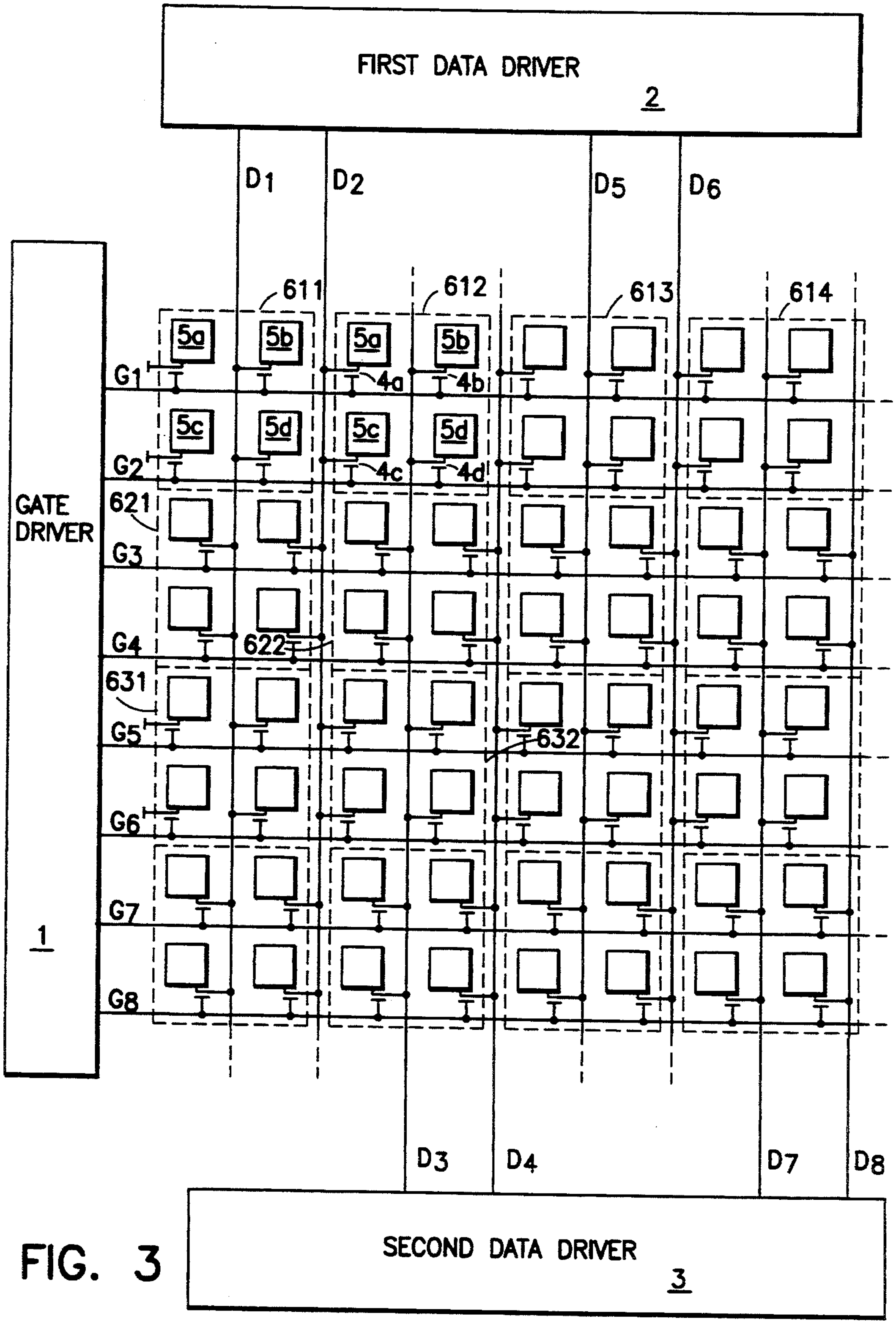
FIG. 3 is a schematic diagram of a liquid crystal panel in accordance with a second embodiment of the invention.

FIG. 3 illustrates a second embodiment of an 8×8 matrix type liquid crystal panel of a liquid crystal display according to the invention. FIG. 3 is similar to FIG. 1 except that the connection of subpixels is different. Adjacent subpixels 5a and 5b, and 5c and 5d of the pixels in the row direction are alternately connected to column conductors connected to a first data driver 2 and column conductors connected to a second data driver 3. Also, adjacent subpixels 5a and 5c, and 5b and 5d in the column direction are alternately connected, every two row conductors, to the column conductors associated with the first data driver 2 and the column conductors associated with the second data driver 3, respectively. For convenience of description, pixel 612 is discussed. The gate electrodes of TFT's 4a and 4b and TFT's 4c and 4d are connected to the row conductor G1 and the row conductor G2, respectively. The drain electrodes of TFT's 4a and 4b are connected to the column conductors D2 and D3 respectively. The drain electrodes of TFT's 4c and 4d are connected to the column conductors D2 and D3, respectively. Further, the source electrodes of TFT's 4a, 4b, 4c, and 4d are connected to the subpixels 5a, 5b, 5c, and 5d, respectively. In the figure, for convenience, the area ratios A:B:C:D of subpixels 5a, 5b, 5c, and 5d comprising one pixel is shown as 1:1:1:1. However, as in the embodiment FIG. 2, 16 levels of grey scale can be displayed by area gradation using ratios of A:B:D=8:2:4:1. Further, the polarities of a first data signal and a second data signal provided by the first data driver 2 and the second data driver 3, respectively are inverted with respect to each other.

The subpixels of the embodiment of FIG. 3 may be driven using another method. As described above with respect to FIG. 2, a control signal is provided to the gate driver 1, the first data driver 2, and the second data driver 3 by a control unit (not shown), to cause these blocks to operate. Gate driver 1 sequentially applies scanning signals to the row conductors G1 to G8. When the scanning signals are applied, the TFT's 4a, 4b and 4c, 4d of each pixel 6 are sequentially turned on.

A first data signal of one polarity from the first driver 2 and a second data signal of the opposite polarity, from the second data driver 3 are applied, simultaneously with the scanning signals, to the first group of the column conductors D1 and D2, and D5 and D6 and to the second group of the column conductors D3 and D4, and D7 and D8, respectively. Thus, for example, the subpixels 5a and 5b of a pixel 612 in the row direction are driven by signals of opposite polarity, and at the same time, the subpixels 5a and 5b of an adjacent pixel 613 are driven by signals of opposite polarity in the same manner as in the pixel 612, thus completely removing flicker between the adjacent pixels. Other adjacent pixels throughout the display are also driven by signals of opposite polarity to completely remove flicker throughout the display. Further, subpixels 5a and 5c which may have the larger subpixel areas in the pixel unit may be arranged on the upper and lower side, respectively, of the pixel unit in the column direction. Thus if the display is operated as set forth above, two adjacent subpixels in the column direction, having the larger subpixel areas are driven by signals of opposite polarity throughout the display. However, two adjacent subpixels (5b and 5d) in the column direction, having the smaller subpixel areas are not driven by signals of opposite polarity; that is, they are driven by signals of the same polarity. Thus, 80% of the total flicker in the column direction will be removed. Further, since the first and the second data drivers are not switched every two row conductors, as in FIG. 2 (instead of switching, the connection of each subpixel to each column conductor is changed), load on the data drivers decreases and the pixels can be driven by a circuit of relatively low power consumption. In other words, load on the data drivers is reduced and the pixels may be driven by a low power consumption circuit because it is the connection of the column conductors which is changed to invert the polarities of the first and the second data signals every two row conductors. This is done instead of using high speed, high amplitude electric switching.

What is claimed is:

1. A liquid crystal display comprising:

a plurality of row conductors;

a plurality of column conductors divided into odd conductor groups and even conductor groups, each of said groups including a first column conductor and a second column conductor; a plurality of subpixels each of which is connected to a column conductor and to a row conductor, a plurality of adjacent subpixels in a row direction and in a column direction forming a pixel, said adjacent subpixels in one pixel being divided into a first subpixel group including adjacent subpixels in said column direction and a second subpixel group including adjacent subpixels in said column direction;

said first column conductor of each of said odd conductor groups being connected to said second subpixel group of each of the pixels which are odd pixels in both row and column direction, and to said first subpixel group of each of the pixels which are even pixels in the row direction and are odd pixels in the column direction, said second column conductor of each of said odd conductor groups being connected to said first subpixel group of each of the pixels which are odd pixels in the row direction and are even pixels in the column direction, and to said second subpixel group of each of the pixels which are even pixels in the row direction and are odd pixels in the column direction;

said first column conductor of each of said even conductor groups being connected to said first subpixel group of each of the pixels which are even pixels in both row and column direction, and to said second subpixel group of each of the pixels which are odd pixels in the row direction and are even pixels in the column direction, said second column conductor of each of said even conductor groups being connected to said first subpixel group of each of the pixels which are odd pixels in both row and column direction, and to said second subpixel group of each of the pixels which are even pixels in both row and column direction; and row driving means for sequentially supplying row signals to said row conductors; and column driving means connected to said column conductors for supplying data signals of one polarity to said odd conductor groups and data signals of an opposite polarity to said even conductor groups and for alternately changing said polarity of data signals applied to said odd conductor groups and said even conductor groups every two rows in said column direction between said one polarity and said opposite polarity.

2. A liquid crystal display according to claim 1 wherein a pixel includes four subpixels.

3. A liquid crystal display according to claim 2 wherein the sizes of said four subpixels are different.

4. A liquid crystal display according to claim 1 wherein the polarity of said first data signal and that of said second data signal is periodically inverted with a repetition interval which is substantially the same as a frame interval.

5. A liquid crystal display according to claim 1 wherein said subpixel includes a thin film transistor and subpixel electrodes to which the thin film transistor is connected.

6. A liquid crystal display according to claim 1 wherein said single pixel displays a predetermined number of gradation levels in accordance with an on/off state of each of said subpixels.

7. A liquid crystal display according to claim 1 wherein subpixels of larger size are arranged as adjacent subpixels on a first side of each said pixel in the column direction of each said pixel.

8. A liquid crystal display according to claim 7 wherein subpixels of smaller size are arranged as adjacent subpixels on a second side opposite said first side in the column direction of each said pixel.

9. A liquid crystal display comprising:

a plurality of row conductors;

a plurality of column conductors divided into odd conductor groups and even conductor groups each of said groups including two or more adjacent conductors;

a plurality of subpixels each of which is connected to a column conductor and to a row conductor, a plurality of adjacent subpixels in a row direction and in a column direction forming a single pixel, said adjacent subpixels in said single pixel being divided into a first subpixel group including adjacent subpixels arranged in said column direction and a second subpixel group including adjacent subpixels arranged in said column direction, said first subpixel group being connected to a first conductor of an odd conductor group and said second subpixel group being connected to a second conductor of said odd conductor group and an adjacent pixel in the row direction having a first subpixel group connected to one conductor of an even conductor group and a second subpixel group connected to a second conductor of said even conductor group; and row driving means for subsequently supplying row signals to said row conductors; and column driving means connected to said column conductors for supplying data signals of one polarity to said odd conductor groups and data signals of an opposite polarity to said even conductor groups, and for alternately changing said polarity of data signals applied to said odd conductor groups and said even conductor groups every two or more rows in said column direction between said one polarity and said opposite polarity.

10. A liquid crystal display according to claim 9 wherein a pixel includes four subpixels.

11. A liquid crystal display according to claim 10 wherein the sizes of said four subpixels are different.

12. A liquid crystal display according to claim 9 wherein the polarity of said first data signal and that of said second data signal is periodically inverted with a repetition interval which is substantially the same as in a frame interval.

13. A liquid crystal display according to claim 9 wherein said subpixel includes a thin film transistor and subpixel electrodes to which the thin film transistor is connected.

14. A liquid crystal display according to claim 9 wherein said single pixel displays a predetermined number of gradation levels accordance with an on/off state of each of said subpixels.

15. A liquid crystal display according to claim 9 wherein subpixels of larger size are arranged to adjacent subpixels on a first side of each said pixel in the column direction of each said pixel.

16. A liquid crystal display according to claim 15 wherein subpixels of a smaller size are arranged as adjacent subpixels on a second side opposite said first side in the column direction of each said pixel.

* * * * *